A. SMOLKER.
CEMENT APPLYING MACHINE.
APPLICATION FILED JAN. 13, 1920.
1,345,512. Patented July 6, 1920.
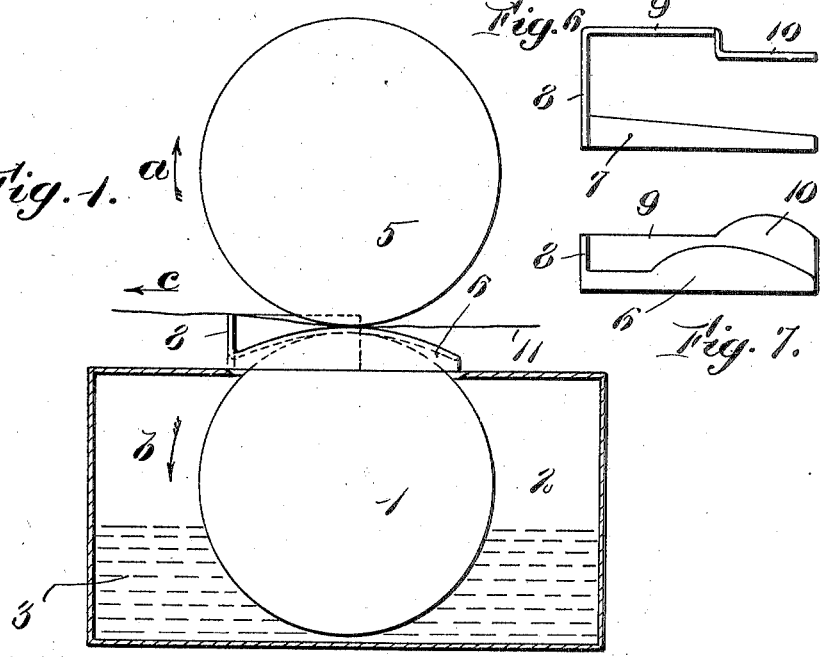
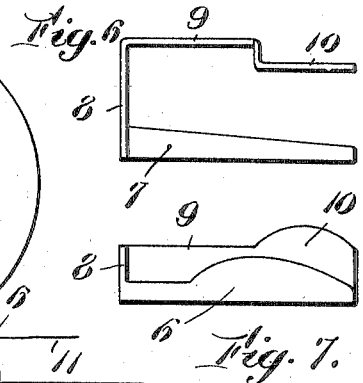
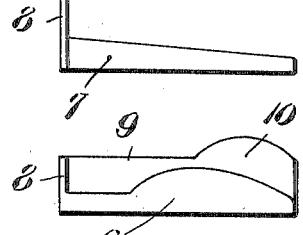
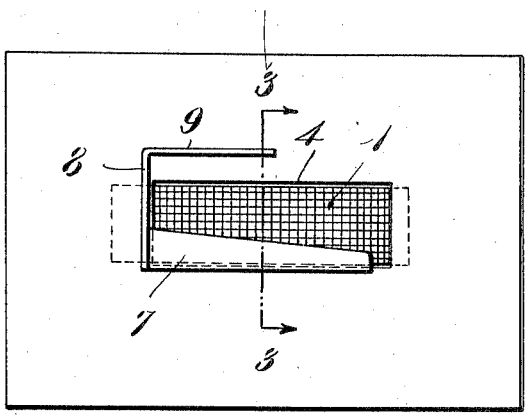
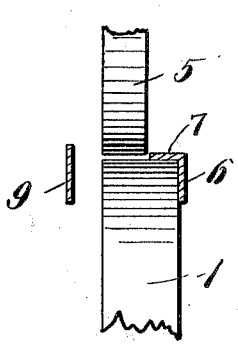
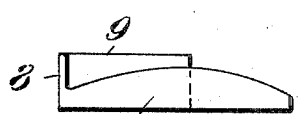
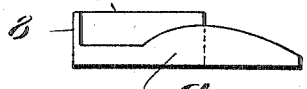
Inventor:
Abraham Smolker
by Ralph W. Foster
Att'y.

UNITED STATES PATENT OFFICE.

ABRAHAM SMOLKER, OF CHELSEA, MASSACHUSETTS.

CEMENT-APPLYING MACHINE.

1,345,512.  Specification of Letters Patent.  Patented July 6, 1920.

Application filed January 13, 1920. Serial No. 351,029.

*To all whom it may concern:*

Be it known that I, ABRAHAM SMOLKER, a subject of Russia, residing at Chelsea, in the county of Suffolk and State of Massachusetts, have invented certain new and useful Improvements in Cement-Applying Machines, of which the following is a specification.

This invention relates to machines for applying cement, or other adhesive substance, to a material, such as leather, for the purpose of attachment to other material; and the object of the invention is to provide for making such application of the cement, or other adhesive substance, in a rapid, neat, inexpensive and efficient manner.

To accomplish this object, I take a well known type of cementing machine, in which the cement conveying wheel, or roll, is vertically and rotatively mounted in a cement tank and extends through the slotted top of the tank, and I attach to the upper face of the top of the tank a device, which partly surrounds and partly covers a portion of the upper part of the cement conveying roll, and which includes a support for the material operated on, a guide for said material, a cement guard, and a scraper for removing surplus cement from the material.

The invention is illustrated by the accompanying drawings, in which: Figure 1 is a sectional view of the tank with the rolls and the device in elevation; Fig. 2 is a plan view of the tank, the lower roll and the device; Fig. 3 is a face view of the rolls partly broken away and showing the device in section; Fig. 4 is a front elevation of the device; Fig. 5 is a similar view of a modification of the device; Fig. 6 is a plan view of a modification of the device; and Fig. 7 is an elevation of the view shown in Fig. 6.

The cement conveying roll 1, preferably grooved as shown in Fig. 2, is vertically and rotatively mounted in the tank 2 with its lower part immersed in the cement 3 contained therein and its upper part extending through the slot 4 in the top of the tank; the feed roll 5 being disposed above the outer portion of the face of the conveying roll; which rolls are here (Fig. 1) conventionally shown, but which, as is well known, are in practice geared to rotate in opposite directions as indicated by the arrows *a* and *b*; it being customary also to cushion the feed roll and to provide a treadle, or similar means, for separating the rolls at the will of the operator; none of which features are shown, however, as they are all well known features of these machines and have nothing to do with the present improvement; the same being true of the various well known methods of supplying the tank with cement and regulating its movement therein, none of which are shown.

The invention consists in combining with the elements above described the following elements: (1) The cement guard 6, which stands between the operator and the side of the cement conveying wheel 1; the flanged top 7 of which extends over a portion of said roll and acts both as a guard and as a support for the material 11, as it travels between the rolls: (2) The scraper 8, at the left of the operator, over which the material is guided by the operator and which serves to remove therefrom the surplus cement: (3) The guide 10, which enables the operator to guide the material as it travels between the rolls in the direction indicated by arrow *c*, Fig. 1. These four elements: guard, support, scraper, and guide, are preferably combined in a single member, which is soldered or otherwise attached to the top of the tank as above described. The guard 6 may be formed as shown in Fig. 4, or as shown in Fig. 5, or its form may be varied as desired; the opposite arm 9 of the device may be of any desired length and may be shaped as in Fig. 6 to furnish the guide 10 along which the material travels when being operated on.

I claim:—

1. In a cementing machine of the character described, in combination, a tank having a slotted top; a cement conveying roll vertically and rotatively mounted therein and extending through the top thereof; and a combined cement guard and work support attached to the top of the tank adjacent to and partly covering the top of the conveying roll.

2. In a cementing machine of the character described, in combination, a tank having a slotted top; a cement conveying roll vertically and rotatively mounted therein and extending through the top thereof; and a combined cement guard, work support, and cement scraper attached to the top of the tank and partly surrounding and partly covering the top of the conveyer roll.

3. In a cementing machine of the character described, in combination, a tank having a slotted top; a cement conveying roll vertically and rotatively mounted therein and extending through the top thereof; and a combined cement guard, work support, cement scraper, and guide attached to the top of the tank and partly surrounding and partly covering the top of the conveyer roll.

4. In a cementing machine of the character described in combination, a tank having a slotted top; a cement conveying roll vertically and rotatively mounted therein and extending through the top thereof; a feed roll disposed above the conveying roll; and a combined cement guard and work support attached to the top of the tank adjacent to and partly covering the top of the conveying roll.

5. In a cementing machine of the character described, in combination, a tank having a slotted top; a cement conveying roll vertically and rotatively mounted therein and extending through the top thereof; a feed roll disposed above the conveying roll; and a combined cement guard, work support, and cement scraper attached to the top of the tank and partly surrounding and partly covering the top of the conveyer roll.

6. In a cementing machine of the character described, in combination, a tank having a slotted top; a cement conveying roll vertically and rotatively mounted therein and extending through the top thereof; a feed roll disposed above the conveying roll; and a combined cement guard, work support, cement scraper, and guide attached to the top of the tank and partly surrounding and partly covering the top of the conveyer roll.

In testimony whereof I have hereto affixed my signature.

ABRAHAM SMOLKER.